United States Patent [19]

Hoffmeister et al.

[11] Patent Number: 4,880,359

[45] Date of Patent: Nov. 14, 1989

[54] SUMMATION POWER OUTPUT REGULATING SYSTEM FOR AT LEAST TWO HYDROSTATIC TRANSMISSIONS

[75] Inventors: Hermann Hoffmeister, Nersingen; Klaus Puvogel, Ulm; Reinhold Schniederjan, Neu-Ulm, all of Fed. Rep. of Germany

[73] Assignee: Hydromatik GmbH, Elchingen, Fed. Rep. of Germany

[21] Appl. No.: 115,762

[22] Filed: Oct. 30, 1987

[30] Foreign Application Priority Data

Nov. 14, 1986 [DE]  Fed. Rep. of Germany ....... 3638889

[51] Int. Cl.⁴ ............................................. F04B 49/08
[52] U.S. Cl. ........................................ 417/216; 60/421
[58] Field of Search ................... 417/216; 60/421, 428

[56] References Cited

U.S. PATENT DOCUMENTS

| Re. 29,333 | 8/1977 | Pewsa | 417/216 |
| 3,968,650 | 7/1976 | Bacquie | 60/428 |
| 4,065,228 | 12/1977 | McMillian | 60/428 |
| 4,379,389 | 4/1983 | Leisener | 60/428 |
| 4,461,148 | 7/1984 | Krusche | 60/421 |
| 4,750,866 | 6/1988 | Entwistle | 417/216 |

FOREIGN PATENT DOCUMENTS

| 2038968 | 2/1972 | Fed. Rep. of Germany | 417/216 |
| 2219269 | 10/1973 | Fed. Rep. of Germany | |
| 2754430 | 6/1979 | Fed. Rep. of Germany | |
| 3323278 | 1/1985 | Fed. Rep. of Germany | |
| 159584 | 12/1981 | Japan | 417/216 |
| 162288 | 1/1982 | Japan | 417/216 |
| 184485 | 1/1982 | Japan | 417/216 |
| 233386 | 11/1985 | Japan | 417/216 |
| 1500836 | 2/1976 | United Kingdom | |

*Primary Examiner*—Leonard E. Smith
*Attorney, Agent, or Firm*—Scully, Scott, Murphy & Presser

[57] ABSTRACT

In a summation power output regulating system for first and second hydrostatic machines (3, 4), having a common drive and comprising at least two hydrostatic transmissions (1, 2), each of the machines (3, 4) having a hydraulic control device (7, 8), wherein the second machine (4) is provided with a hydraulic power output regulator (24) which regulates the pressure acting on the control device (8) in dependence on the power output of the second machine at that time and a control pressure, dependant on the working pressure of the first machine, is transmitted by means of a hydraulic actuator to the power output regulator (24), substantially 100% utilization of the power available is attained with a simple construction and function by providing the first machine (3) with a power output measuring valve (34; 63, 64) which determines the power output at the time and regulates the control pressure ($P_3$) in dependence on the power output of the first machine.

3 Claims, 3 Drawing Sheets

SUMMATION POWER OUTPUT REGULATING SYSTEM FOR AT LEAST TWO HYDROSTATIC TRANSMISSIONS

TECHNICAL FIELD OF THE INVENTION

The invention concerns a summation power output regulating system for hydrostatic machines of at least two hydrostatic transmissions, driven by a common drive, with a hydraulic control device for each of the first and the second machines, and wherein the second machine is provided with a hydraulic power output regulator which regulates the pressure acting on the control device in dependence on the power output from the second machine and wherein a control pressure, dependent on the working pressure of the first machine, is transmitted by a hydraulic actuator to the power output regulator.

BRIEF DESCRIPTION OF THE PRIOR ART

A summation power output regulating system of this kind is described and portrayed in DE-OS 33 23 278. The function of this kind of power output regulating system is to control the hydrostatic machines so that the power available from the common drive is not exceeded.

In the known arrangement, the machine of the first transmission is not output regulated whilst the machine of the second transmission is output regulated. As a result of this the output regulation of the machine of the second transmission, namely the second machine, is dependant upon the working pressure of the first machine in such a way that with increasing working pressure a lower power output is set for the second machine. As a result of this the first transmission is given a priority, i.e. the hydro-motor supplied by the working circuit of the first transmission is driven in priority.

The known regulating device has proved itself to be functionally efficient and useful. However, it still has the disadvantage that when the first machine is not output regulated, and even when it is output regulated, satisfactory utilization of the power available is not possible because of the dependance of the output regulation of the second machine on the working pressure of the first machine.

OBJECT OF THE INVENTION

The object of the invention is to develop a power output regulating device of the kind specified in the introduction so that substantially 100% utilization of the power available is possible, while ensuring simple construction and function.

SUMMARY OF THE INVENTION

This object is achieved by a summation power output regulating system for hydrostatic machines of at least two hydrostatic transmissions, driven by a common drive, with a hydraulic control device for each of the first and second machines. The second machine is provided with a hydraulic power output regulator which regulates the pressure acting on the control device in dependence upon the power output from the second machine. A control pressure depending upon the working pressure of the first machine is transmitted by a hydraulic actuator to the power output regulator. Moreover, pursuant to the present invention the first machine is provided with a first power output measuring valve which determines its power output and controls the control pressure in dependance thereon.

In the design according to the invention it is not the working pressure but a pressure signal proportional to the power uptake that is transmitted to the power output regulator of the second machine as control variable. As a result of this, the available driving power can be used completely, even in the case of pressure cutting, load-sensing-regulation or other working pressure variations for demand controls.

It is already known per se from DE-OS 20 38 968, in the case of a summation power output regulator for parity-regulated hydrostatic machines, to carry out the output regulation of each machine in dependance on the working pressure and on the delivery volume or displacement of the other machine, but in this known design adjustable throttles are used to determine or transmit both the working pressure and the delivery volume, which results in both power losses and a costly and complicated control system. The latter occurs because the adjustment of one throttle inevitably influences the effect of the other throttle. In contrast to this, the design according to the invention employs a measuring valve which determines the power uptake of the first machine as a result, and by means of which the signal corresponding to the power uptake of the first machine can be transmitted in a simple way to the output regulator of the second machine.

Advantageous developments of the invention are a summation power output regulating system for equal-priority working circuit using the advantages according to the invention. Pursuant to this feature, the hydraulic control devices have control cylinders with double-acting pistons, of which one working chamber is subjected to the working pressure of its associated machine. The other working chamber is subjected to a second control pressure which is respectively regulated by a power output regulating valve acted on by the first control pressure.

BRIEF DESCRIPTION OF THE DRAWINGS

The invention will now be described with reference to preferred embodiments shown by way of example in simplified drawings, in which.

DETAILED DESCRIPTION OF PREFERRED EMBODIMENTS OF THE INVENTION

Figure 1:
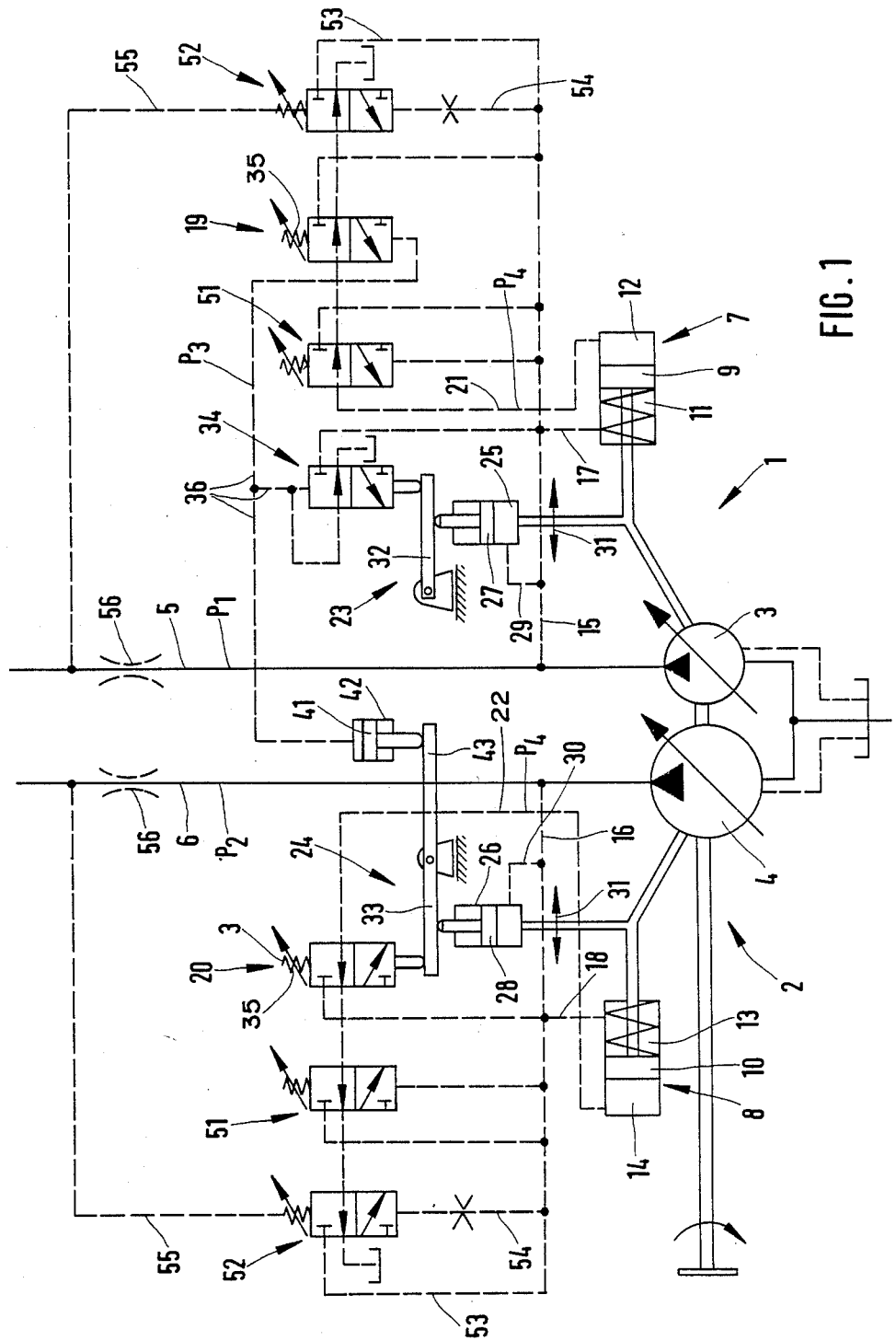
FIG. 1 shows a summation power output regulating system constructed according to the invention for two hydrostatic machines of which one is regulated in priority.

In all the embodiments two hydrostatic transmissions numbered 1 and 2 are provided, respectively having hydro-pumps 3, 4 with variable delivery volume which are driven by a common drive motor (not shown), in particular one with constant speed, e.g. a diesel engine. The associated hydro-motors are not shown. The working circuits or lines are numbered 5, 6.

To control the hydro-pumps 3, 4, there are provided identical control devices 7, 8 with control pistons 9, 10, with pressure acting on both sides, which each bound first and second working chambers 11, 12; 13, 14. Each first working chamber 11, 13 is subjected to the working pressure through connecting lines 15, 16, 17, 18, whilst each second working chamber 12, 14 is subjected to a control pressure, regulated by means of a power output regulating valve 19, 20, which is delivered to the second working chambers 12, 14 through connecting lines 21, 22.

Each regulating valve 19, 20 is associated with a power output regulator, indicated generally by 23, 24, which regulates the control pressure in dependance on the working pressure and on the delivery volume of the corresponding hydro-pump 3, 4. For this purpose, each power output regulator 23, 24 has a hydraulic cylinder 25, 26 with a piston 27, 28 on which the working pressure can act through a connecting line 29, 30. The cylinders 25, 26 are mechanically connected to the piston rods of the control pistons 9, 10, i.e. they are displaced with these: cf. the double arrows 31. The pistons 27, 28 of the cylinders 25, 26 each act against a fixed swivelling lever arm 32, 33, the lever arm 32 of the first power output regulator 23 being acted on on its side facing away from the cylinder 25 by the valve slide of a power measuring valve 34, whilst the lever arm 33 of the power output regulator 24 is in operative connection on its other side with the valve slide of the regulating valve 20, which is urged against the lever arm 33 by means of a spring 35 with adjustable resilience.

The measuring valve 34 regulates a control pressure in a branch connecting line 36, which is primary in relation to the control pressure in the connecting line 21 because it acts on the regulating valve 19. The primary control pressure is therefore numbered $P_3$ to distinguish it from the control pressure $P_4$ in the connecting line 21 and the working pressures $P_1$ and $P_2$ in the working circuits 5, 6. The control pressure $P_3$ also acts on a piston 41 in a hydraulic cylinder 42, which acts as a hydraulic actuator against the lever arm 33. In the present embodiment a two-armed lever is provided, of which the second arm is numbered 43, with the piston 41 acting against the lever 43 and producing a turning moment which supplements the turning moment produced by the piston 28 of the cylinder 26 and thus opposes the regulating valve 20.

Each power output regulator 23, 24 is also provided with a pressure limiting valve 51 and a load sensing valve 52. The pressure limiting valve 51 with which the power output regulator 23 is provided is connected in series after the regulating valve 19 in the connecting line 15/21. The pressure limiting valve 51 with which the power output regulator 24 is provided is connected in series before the regulating valve 20 in the connecting line 16/22. The valves 52, as shown, are arranged in a parallel connecting line 53 and are acted on through the connecting lines 54, 55 by the working pressure $P_1$ and $P_2$, respectively, before and behind a throttle 56.

In operation of the hydro-pumps 3, 4 a pressure signal proportional to the power uptake of the hydro-pump 3 is transmitted to the second power output regulator 24 by means of the piston 41 in such a way that with increasing operating pressure $P_1$ the power output of the hydro-pump 4 is reduced. In doing so, the piston 41 acts correspondingly on the regulating valve 20 by means of the lever arm 33. Hence, the hydro-pump 3 is regulated in priority. In the case of operation outside the range of regulation, or of other overriding controls (load-sensing, pressure cutting), the unused power available from the first hydro-pump 3 is transferred to the second hydro-pump 4, so that substantially complete utilization of the power is guaranteed.

Figure 2:
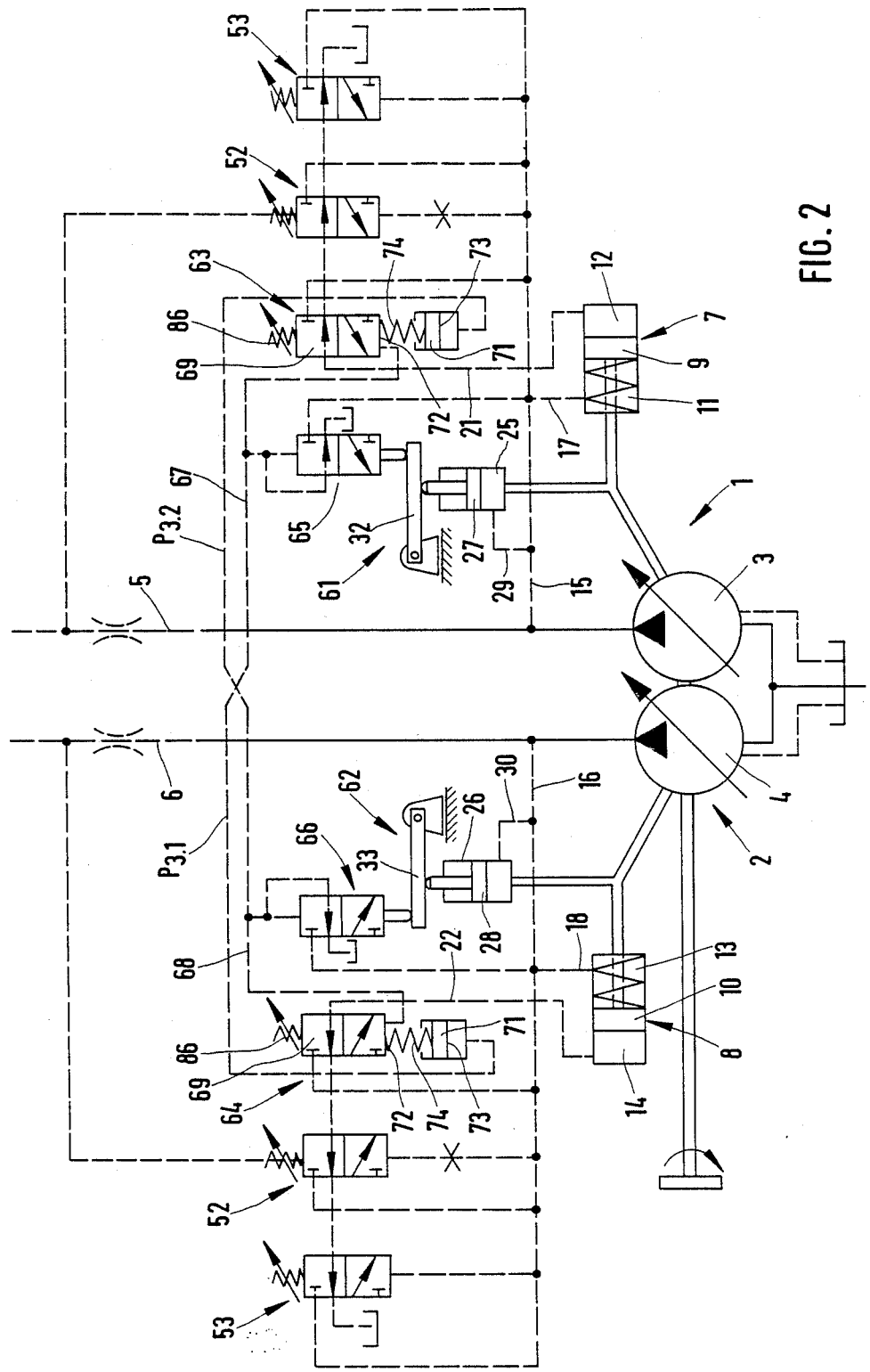
FIG. 2 shows a summation power output regulating system constructed according to the invention for two hydrostatic machines with equal-priority regulation.

In the embodiment according to FIG. 2 the same parts are numbered with the same reference numbers. The second embodiment differs from the previous one essentially in that each power output regulator, here numbered 61 and 62, has a power output regulating valve 63, 64 and a power output measuring valve 65, 66, the regulating valves 63, 64, being acted on through connecting lines 67, 68, by the control pressures $P_{3,1}$ and $P_{3,2}$ which are regulated by the measuring valves 65, 66. Apart from that the slides of the regulating valves 63, 64, which as in the first embodiment are displaceable against a spring 86 of variable resilience, are formed in two parts, so that each slide part 69, 71 has a surface 72, 73 that is acted on by pressure, with each of these surfaces 72, 73 acting in the same direction of movement and a pressure spring 74 being arranged between the slide parts 69, 71.

In addition the order of arrangement of the valve 52, the pressure limiting valve 51 and the regulating valve 63, 64 differs from that of the first embodiment. In the second embodiment the valve 52 is situated in the connecting line 15/21, in each case centrally between the pressure limiting valve 51 and the regulating valve 63 or 64, and in each case the valve 52, viewed from the working chambers 12, 14, is arranged after the pressure limiting valve 51.

In the second embodiment according to FIG. 2, the hydro-pumps 3, 4 are regulated with equal priority, so that the full utilization of the power output available occurs alternately.

Figure 3:
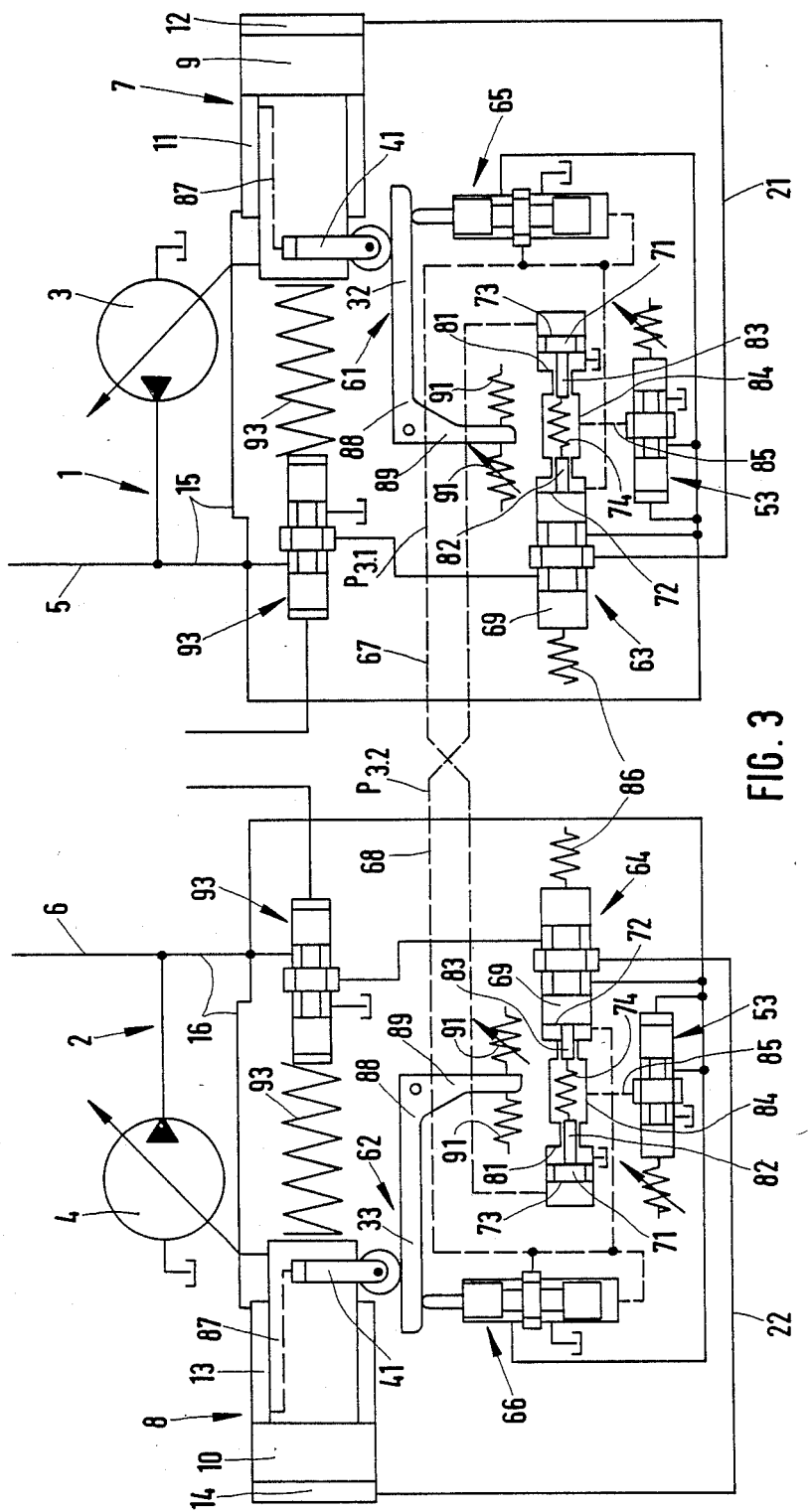
FIG. 3 shows a summation power output regulating system constructed according to the invention for hydrostatic machines with equal-priority regulation as another embodiment.

The embodiment according to FIG. 3 corresponds essentially to the embodiment according to FIG. 2. The same parts are again given the same reference numbers. Associated with the piston slide parts numbered 71 of the regulating valves 63, 64, and on the side facing away from the surface 73, there are stops 81 which limit, at the start of the respective control region, the influence of the control pressures $P_{3,1}$ and $P_{3,2}$, which are respectively controlled by the measuring valve 65, 66 not associated therewith, i.e. which respectively originate from the hydro-motor 3, 4 not associated therewith. On the other hand, the action on the regulating valves 63, 44 of the respective control pressures, which are regulated by the associated measuring valves 65, 66, is maintained so as to control the regulating valves 63, 64 in the regulating area.

The piston slide parts 69, 71 respectively have pistons 82, 83 facing one another and projecting into a cylinder 84, in which the pressure spring 74 is arranged between the pistons 82, 83. According to this embodiment, the cylinder 84 is linked, by means of a connecting line 85, to the pressure controlled by the respective pressure limiting valve 53, so that this pressure influences the control valve parts 69, which carry the control edges, both directly and through a stop 81 that operates later as the distance between the piston valve parts 69, 71 increases. Preferably the stop 81 is also adjustable.

In this embodiment the piston 27 or 28 of the cylinder 25 or 26 is placed in the respective control piston 9, 10 of the control device 7, 8, the connecting line 87 leading to the cylinder 25 or 26 being in the respective control piston 9, 10. In addition, an angled lever 88 is provided here with a pressure spring 91 acting on at least one side, and preferably on both sides, against its arm 89, the resilience of at least one pressure spring 91 being adjustable. In addition, in these embodiments the return springs 93 for the control pistons 9, 10 are arranged, by way of example, outside of the control cylinders.

As in the embodiments previously described, it can also be seen in the embodiment according to FIG. 3 that the control pressures $P_{3.1}$ and $P_{3.2}$ regulated by the measuring valves 34; 65, 66 act on the slides of the measuring valves 34; 65, 66.

The valves in FIG. 3 numbered 93 which, viewed from the respective operating line 5, 6, are arranged before the control valves 63, 64 in the connection line 15/21, 16/22, can be load sensing valves or flow regulating valves, for example for demand control, e.g. speed control.

In the embodiments according to FIG. 2 and FIG. 3, in which the hydro-pumps 3, 4 are regulated with equal parity, the control signal which influences the respective other hydro-pump must be limited. In the case of two hydro-pumps set up with the same performance characteristic curve, the control signal must therefore be either mechanically or hydraulically limited to half, which is done by means of the stops 81.

What is claimed is:

1. A summation power output regulating system for hydrostatic machines of at least two hydrostatic transmissions, driven by a common drive, with a hydraulic control device, having a control piston, for each of the first and the second machines, wherein the second machine is provided with a hydraulic power output regulator which regulates the pressure acting on the control device in dependence upon the power output from the second machine, and wherein a control pressure depending on the working pressure of the first machine is transmitted by a hydraulic actuator to said power output regulator, characterized in that the first machine is provided with a first power output measuring valve which determines the power output of the first machine and controls the control pressure ($P_3$) in dependence upon the power output of the first machine, wherein said first power output measuring valve includes a piston slide and is operatively connected with a piston acted on by the operating pressure ($P_1$, $P_2$) of the associated machine, which is arranged in the associated control piston so that it can move transversely of and be adjusted with the control piston, wherein, arranged between the piston slide of said measuring valve and said piston, a lever arm is mounted to pivot about a fixed axis extending transversely of the axis of the associated control piston and transversely of the valve slide of said measuring valve (34).

2. A summation power output regulating system according to claim 1, characterized in that the first machine is also output-regulated by a power output regulator.

3. A summation power output regulating system according to claim 1, characterized in that said hydraulic control devices have control cylinders with double-acting pistons, of which one working chamber is subjected to the working pressure ($P_1$, $P_2$) of its associated machine, and the other working chamber is subjected to a second control pressure ($P_4$) which is respectively regulated by a power output regulating valve.

* * * * *